United States Patent
Jung et al.

(10) Patent No.: US 7,368,008 B2
(45) Date of Patent: May 6, 2008

(54) INK SET, INKJET RECORDING APPARATUS COMPRISING THE INK SET, AND METHOD OF FORMING IMAGE USING THE INK SET

(75) Inventors: Yeon-kyoung Jung, Suwon-si (KR); Seung-min Ryu, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 280 days.

(21) Appl. No.: 11/105,489

(22) Filed: Apr. 14, 2005

(65) Prior Publication Data

US 2005/0263035 A1 Dec. 1, 2005

(30) Foreign Application Priority Data

May 25, 2004 (KR) ................ 10-2004-0037250

(51) Int. Cl.
*C09D 11/02* (2006.01)
(52) U.S. Cl. .................... 106/31.58; 106/31.86
(58) Field of Classification Search ........... 106/31.58, 106/31.86
See application file for complete search history.

(56) References Cited

U.S. PATENT DOCUMENTS

| | | |
|---|---|---|
| 6,475,271 B2 | 11/2002 | Lin |
| 6,500,880 B1 | 12/2002 | Parazak |
| 6,630,017 B2 | 10/2003 | Ma et al. |
| 6,670,409 B2 | 12/2003 | Yatake |
| 2002/0038613 A1* | 4/2002 | Yatake .............. 106/31.6 |
| 2003/0097961 A1* | 5/2003 | Yatake et al. ......... 106/31.59 |

FOREIGN PATENT DOCUMENTS

| | | |
|---|---|---|
| JP | 3-259967 | 11/1991 |
| JP | 04-211467 | 8/1992 |
| JP | 9-316376 | 9/1997 |
| JP | 2002-294110 | 10/2002 |
| JP | 2003-138186 | 5/2003 |
| KR | 1998-32045 | 7/1998 |
| KR | 2002-22419 | 3/2002 |
| KR | 10-2002-0067529 | 8/2002 |
| KR | 2004-10725 | 1/2004 |

OTHER PUBLICATIONS

Korean Patent Office Action for corresponding Korean Patent Application No. 10-2004-0037250 dated Nov. 21, 2005.

* cited by examiner

*Primary Examiner*—J. A. Lorengo
*Assistant Examiner*—Veronica Faison-Gee
(74) *Attorney, Agent, or Firm*—Staas & Halsey LLP

(57) ABSTRACT

An ink set, an inkjet recording apparatus including the ink set, and a method of forming an image using the ink set include a black ink composition comprising a first colorant, water, and a first alkyl ether and a color ink composition comprising a second colorant, water, and a second alkyl ether, wherein an amount of the first alkyl ether based on 100 parts by weight of the black ink composition is at most twice an amount of the second alkyl ether based on 100 parts by weight of the color ink composition. When using the ink set, an image of effective quality may be formed which has a reduced bleeding without decreasing an image density.

14 Claims, 1 Drawing Sheet

Figure 1:
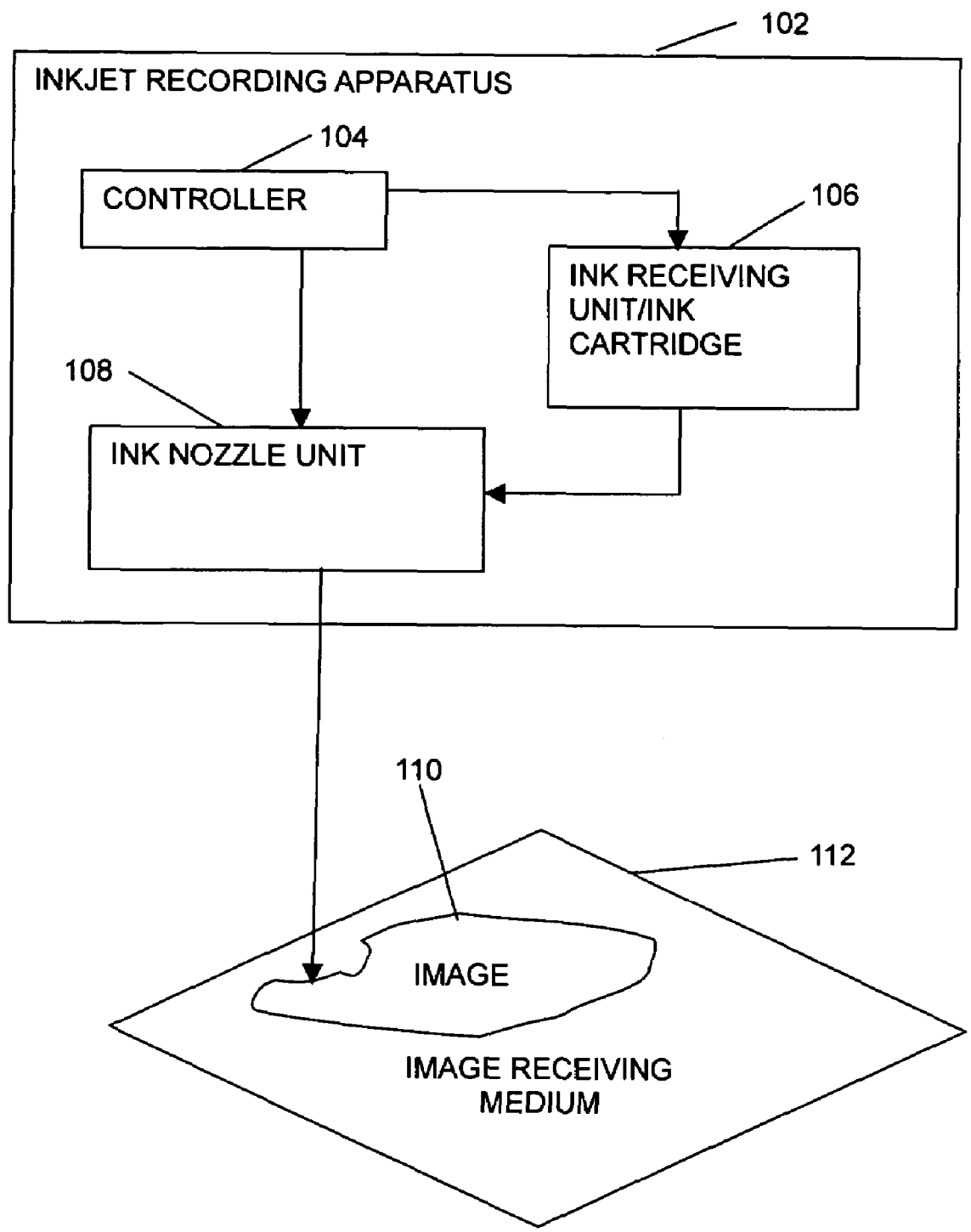

INK SET, INKJET RECORDING APPARATUS COMPRISING THE INK SET, AND METHOD OF FORMING IMAGE USING THE INK SET

CROSS-REFERENCE TO RELATED APPLICATIONS

This application claims the benefit of Korean Patent Application No.10-2004-0037250, filed on May 25, 2004, in the Korean Intellectual Property Office, the disclosure of which is incorporated herein in its entirety by reference.

BACKGROUND OF THE INVENTION

1. Field of the Invention

The present invention relates to an ink set comprising at least two ink compositions, an inkjet recording apparatus comprising the ink set, and a method of forming an image using the ink set, and more particularly, to an ink set which reduces bleeding between ink compositions having different colors from each other, especially a black ink composition and a color ink composition without detriment to an image density on a recording medium, an inkjet recording apparatus including the ink set, and a method of forming an image using the ink set.

2. Description of the Related Art

Inkjet recording apparatuses form an image on a recording medium by discharging ink droplets through fine nozzles. Inkjet ink should have an excellent drying property on a recording medium, and bleeding of an image formed therefrom must be reduced. Further, inkjet ink should exhibit a uniform image irrespective of the types of recording medium, and when printing colors, bleeding must be reduced at the interfaces between colors. In addition, inkjet ink should have excellent image durability, such as water resistance, light resistance, abrasion resistance, and the like.

Various ink compositions have been proposed to satisfy the above requirements. In particular, a method of preventing bleeding between colors by increasing a drying speed of ink has been proposed. Drying of the ink occurs through two mechanisms—evaporation and penetration. Evaporation depends on a vapor pressure of the ink, while penetration depends on interfacial energy between the ink and a recording medium. To shorten a drying time by increasing a speed at which ink penetrates into a recording medium and decrease bleeding between colors, many methods, for example, addition of penetrants, have been proposed. For example, U.S. Pat. No. 5,156,675 discloses the addition of diethylene glycol monobutyl ether into ink, U.S. Pat. No. 5,196,056 discloses the addition of diethylene glycol monobutyl ether and sulfonyl 465 into ink, U.S. Pat. No. 6,132,502 discloses the addition of glycol monobutyl ether, such as diethylene glycol monobutyl ether, triethylene glycol monobutyl ether, propylene glycol monobutyl ether, and dipropylene glycol monobutyl ether into ink.

The penetrants described above increase a drying speed of the ink, thus reducing bleeding between colors. However, if a large amount of penetrant is present in the ink composition, an insufficient amount of ink remains on a surface of a recording medium, and thus an image density may be decreased. Especially, when realizing a black image by mixing Cyan/Magenta/Yellow to realize a mixed black image, the image density may be increased using color matching with software, even though each image density of the color inks is low. However, in this case, consumption of the inks is increased. Thus, it is advantageous to use black ink to print the black image.

Meanwhile, in general, a drying time of the black ink is longer than a drying time of the color ink. When the drying time of the black ink is significantly longer than that of the color ink, the bleeding cannot be sufficiently reduced even when the color inks are rapidly dried. Considering that one of the goals is to have inkjet printing speed of 30 ppm, 60 ppm or faster for a text mode, the drying time of the black ink is required to be reduced in view of the bleeding and the printing speed. As described above, when a penetrant is added to ink to reduce the drying time, the image density must remain high. In the conventional method, the amount of the penetrant was determined without considering the color of the ink. It is important to add a sufficient amount of penetrant depending on the color of the ink.

SUMMARY OF THE INVENTION

The present invention provides an ink set which reduces bleeding between ink compositions having different colors, especially a black ink composition and a color ink composition, by optimizing a maximum amount of a penetrant to be added to the black ink composition without detriment to an image density to provide an image of high quality, an inkjet recording apparatus comprising the ink set, and a method of forming an image using the ink set.

According to an aspect of the present invention, an ink set comprises a black ink composition that includes a first colorant, water, and a first alkyl ether and a color ink composition comprising a second colorant, water, and a second alkyl ether, wherein an amount of the first alkyl ether based on 100 parts by weight of the black ink composition is at most twice an amount of the second alkyl ether based on 100 parts by weight of the color ink composition.

According to another aspect of the present invention, an inkjet recording apparatus comprises an ink receiving unit or an ink cartridge containing the above ink set.

According to still another aspect of the present invention, a method forms an image containing a plurality of colors using the ink set.

Additional aspects and/or advantages of the invention will be set forth in part in the description which follows and, in part, will be obvious from the description, or may be learned by practice of the invention.

BRIED DESCRIPTION OF THE DRAWINGS

These and/or other aspects and advantages of the invention will become apparent and more readily appreciated from the following description of the embodiments, taken in conjunction with the accompanying drawing of which:

FIG. 1 is a block diagram of an inkjet recording apparatus in accordance with an embodiment of the present invention.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

As used herein, the term "black ink composition" refers to an ink composition which includes a colorant capable of exhibiting black color. As used herein, the term "color ink composition" refers to an ink composition which includes a colorant capable of exhibiting all other colors except for black. As used herein, the terms "first colorant" and "second colorant" refer to a colorant contained in the black ink composition and a colorant contained in the color ink composition, respectively. As used herein, the terms "first alkyl ether" and "second alkyl ether" refer to alkyl ether contained in the black ink composition and alkyl ether contained in the color ink composition, respectively. The first alkyl ether and the second alkyl ether may be identical to or different from each other. As used herein, the term "ink set" refers to an ink composition package comprising two or more ink compositions having different colors from each other to form a color image.

In the ink set according to an embodiment of the present invention, an amount of the first alkyl ether based on 100 parts by weight of the black ink composition may be at most twice an amount of the second alkyl ether based on 100 parts by weight of the color ink composition. In this way, by controlling the amount of the first alkyl ether contained in the black ink composition and the amount of the second alkyl ether contained in the color ink composition, bleeding between the black ink composition and the color ink composition may be reduced while controlling a reduction in the image density of the black ink composition, which reduction is highly correlated to an increase in the penetration amount of the ink. Accordingly, the bleeding may be reduced and a quality of an image may be increased at efficient printing speeds without detriment to the image density of the black ink composition.

The first colorant and the second colorant, respectively contained in the black ink composition and the color ink composition constituting the ink set according to an embodiment of the present invention, are not specifically limited. That is, the first colorant and the second colorant may be a dye which is soluble in or dispersible in water, a pigment which may be dispersed in water in a stable state together with a dispersing agent, a self-dispersible pigment, which can be dispersed in water in a stable state, without a separate dispersing agent, or mixtures thereof.

Specific examples of the dye include, but are not limited to, FOOD BLACK dyes, FOOD RED dyes, FOOD YELLOW dyes, FOOD BLUE dyes, ACID BLACK dyes, ACID RED dyes, ACID BLUE dyes, ACID YELLOW dyes, DIRECT BLACK dyes, DIRECT BLUE dyes, DIRECT YELLOW dyes, anthraquinone dyes, monoazo dyes, disazo dyes, and phthalocyanine derivatives. Specific examples of the pigment include, but are not limited to, carbon black, graphite, vitreous carbon, activated charcoal, activated carbon, anthraquinones, phthalocyanine blue, phthalocyanine green, diazos, monoazos, pyranthrones, perylene, quinacridone, and indigoid pigments. The amount of the first colorant may be 0.1 to 15 parts by weight, and more preferably, 1 to 10 parts by weight, based on 100 parts by weight of the black ink composition. The amount of the second colorant may be 0.1 to 15 parts by weight, and more preferably, 1 to 10 parts by weight, based on 100 parts by weight of the color ink composition.

The first alkyl ether and the second alkyl ether, respectively contained in the black ink composition and the color ink composition, which constitute the ink set according to an embodiment of the present invention make the respective ink compositions penetrate rapidly into a recording medium to reduce drying time of the ink compositions and reduce a time during which the different inks come in contact with each other at interfaces. Thus, bleeding between the different colors may be reduced.

The first alkyl ether and the second alkyl ether may have a boiling point of 110° C. or more, preferably 120° C. or more. If the boiling point of the alkyl ethers is less than 110° C., the ink may be dried at nozzle sides, resulting in nozzle clogging, and the like.

In the present embodiment, specific and suitable examples of the first alkyl ether and the second alkyl ether include a compound represented by formula 1:

$$R_1-O-(R_2-O)_m-R_3 \quad (1)$$

wherein
$R_1$ is a $C_1$-10 alkyl group;
$R_2$ is a $C_{2-6}$ alkylene group;
$R_3$ is a hydrogen atom or a $C_{1-10}$ alkyl group; and
m is an integer of 1 to 10.

In formula 1, $R_1$ may be a $C_{1-6}$ alkyl group, $R_2$ may be a $C_{2-3}$ alkylene group, $R_3$ may be a hydrogen atom or a $C_{1-6}$ alkyl group, and m may be an integer of 1 to 5. Specific examples of the first alkyl ether and the second alkyl ether include 2-(2-butoxyethoxy)ethanol ($C_4H_9OCH_2CH_2OCH_2CH_2OH$), 2-(2-ethoxyethoxy)ethanol ($C_2H_5OCH_2CH_2OCH_2CH_2OH$), 2-methoxyethanol ($CH_3OCH_2CH_2OH$), 2-butoxyethanol ($C_4H_9OCH_2CH_2OH$), 2-(2-methoxyethoxy)ethanol ($CH_3OCH_2CH_2OCH_2CH_2OH$), 1,1'-oxybis(2-ethoxy) ethane ($C_2H_5OCH_2CH_2OCH_2CH_2OC_2H_5$), 2-(2-(2-methoxyethoxy)ethoxyethanol ($CH_3OCH_2CH_2OCH_2CH_2OCH_2CH_2OH$), 2-(2-(2-butoxyethoxy)ethoxyethanol ($C_4H_9OCH_2CH_2OCH_2CH_2OCH_2CH_2OH$), 2-propoxyethanol ($C_3H_7OCH_2CH_2OH$), 2-propoxypropanol ($C_3H_7OCH_2CH_2CH_2OH$), and 1-(2-butoxymethylethoxy)propanol ($C(CH_3)_3OCH_2CH(CH_3)OCH_2CH(CH_3)OH$). The amount of the first alkyl ether contained in the black ink composition in the ink set according to an embodiment of the present invention may be not more than 40 parts by weight, and preferably 0.001 to 30 parts by weight based on 100 parts by weight of the black ink composition. According to this, the amount of the first alkyl ether contained in the black ink in the ink set may be 0 parts by weight. That is, the ink set according to an embodiment of the present invention includes an ink set comprising the first black ink composition that comprises the first colorant and water and the color ink composition that comprises the second colorant, water, and the second alkyl ether. An ordinary person skilled in the art may easily recognize from the specification and the claims of the present application that such an ink set not containing the first alkyl ether pertains to the ink set in which the amount of the first alkyl ether based on 100 parts by weight of the black ink composition is less than an amount of the second alkyl ether based on 100 parts by weight of the color ink composition. In the ink set according to an embodiment of the present invention, the amount of the second alkyl ether contained in the color ink composition may be 0.01 to 20 parts by weight, and preferably 1 to 15 parts by weight based on 100 parts by weight of the color ink composition.

If the amounts of the first alkyl ether and the second alkyl ether are greater than the upper limits of the ranges described above, a large amount of ink penetrates into the recording medium, and an insufficient amount of ink remains on a surface of the recording medium, thus reducing the image densities. Especially, the black image has a greater reduction in the image density due to the penetration when compared to the color image and may have reduced line sharpness. Further, the wetting effect at nozzles becomes stronger, thus decreasing straightness of ink droplets when discharging. If the amounts of the first alkyl ether and the second alkyl ether are less than the lower limits of the ranges described above, a drying time increases, and more bleeding occurs. In this case, especially when using pigment ink, penetration of the ink into the recording medium rarely occurs, and most pigment particles remain on the surface of the recording medium, thus reducing abrasion resistance.

The ink compositions may further comprise a co-solvent. Organic solvents are mainly used as the co-solvent, and may dissolve or disperse the colorant together with water. The co-solvent may be selected from the group consisting of alcohol compounds, such as methyl alcohol, ethyl alcohol, n-propyl alcohol, isopropyl alcohol, n-butyl alcohol, sec-butyl alcohol, t-butyl alcohol or isobutyl alcohol; ketone compounds, such as acetone, methyl ethyl ketone, diethyl ketone or diacetone alcohol; ester compounds, such as methyl acetate, ethyl acetate or ethyl lactate; polyhydric alcohol compounds, such as ethylene glycol, diethylene glycol, triethylene glycol, propylene glycol, butylene glycol, 1,4-butane diol, 1,2,4-butane triol, 1,5-pentane diol, 1,2,6-hexane triol, hexylene glycol, glycerol, glycerol ethoxylate or trimethylolpropane ethoxylate; nitrogen-containing compounds, such as 2-pyrolidone or N-methyl-2-pyrolidone; and sulfur-containing compounds, such as dimethyl sulfoxide, tetramethylenesulfone or thioglycol, and but are not limited thereto. In the ink compositions according to an exemplary embodiment and another exemplary embodiment of the present invention, the amount of the co-solvent may be 3 to 35 parts by weight, and preferably 5 to 30 parts by weight based on 100 parts by weight of each ink composition.

The ink compositions may further comprise a wetting agent. The wetting agent such as polyhydric alcohol, prevents clogging of the ink composition at the nozzles. Specific examples of the wetting agent include glycerin, ethylene glycol, diethylene glycol, triethylene glycol, propylene glycol, dipropylene glycol, hexylene glycol, 1,3-butane diol, 1,4-butane diol, 1,5-pentane diol, 2-buten-1,4-diol, 2-methyl-2-pentane diol and mixtures thereof. In the ink compositions according to exemplary embodiments of the present invention, the amount of the wetting agent may be 3 to 25 parts by weight, and preferably 5 to 20 parts by weight based on 100 parts by weight of each ink composition.

The ink compositions may further comprise a surfactant. The surfactant controls the surface tension of the ink compositions to stabilize a jetting performance at nozzles and controls the degrees of penetration of the inks into the recording medium. An anionic surfactant, a cationic surfactant or a non-ionic surfactant may be used as the surfactant. Examples of the anionic surfactant include $C_{1-1000}$ alkylcarboxylates (preferably, $C_{10-200}$ alkylcarboxylates), $C_{1-1000}$ alcohol sulfonic acid ester salts (preferably, $C_{10-200}$ alcohol sulfonic acid ester salts), $C_{1-1000}$ alkylsufonates (preferably, $C_{10-200}$ alkylsufonates), $C_{1-1000}$ alkylbenzenesulfonates (preferably, $C_{10-200}$ alkylbenzenesulfonates), and mixtures thereof. Examples of the cationic surfactant include salts of fatty acid amine, quaternary ammonium salts, sulfonium salts, phosphonium salts, and mixtures thereof. Examples of the non-ionic surfactant include polyoxyethylene alkyl ether (wherein alkyl is a $C_{1-1000}$ alkyl group, and preferably a $C_{10-200}$ alkyl group), polyoxyethylene alkyl phenyl ether (wherein alkyl is a $C_{10-1000}$ alkyl group, and preferably a $C_{10-200}$ alkyl group), polyoxyethylene secondary alcohol ether, polyoxyethylene-oxypropylene block copolymer, polyglycerin fatty acid ester, sorbitan fatty acid ester, and mixtures thereof. In the ink compositions according to exemplary embodiments of the present invention, the amount of the surfactant may be 0.01 to 5 parts by weight, and preferably 0.1 to 3 parts by weight based on 100 parts by weight of each ink composition.

The ink compositions, according to exemplary embodiments of the present invention, may further comprise at least one dispersing agent, if necessary, for dispersing the colorant stably, when the colorant is not a self-dispersible pigment or the colorant is a dye which is water-insoluble. Any dispersing agent may be used in the exemplary embodiments of the present invention. That is, a low molecular weight dispersing agent which has a relatively simple structure, as well as a high molecular weight dispersing agent, such as a block copolymer, which has a relatively complicated structure and may limit rheology, stability, and functions of the ink, may be used in the ink compositions. Specific examples of the low molecular weight dispersing agent which has a relatively simple structure include, but are not limited to, polyvinyl alcohol (PVA), cellulosics, ethylene oxide modified phenols, ethylene oxide/propylene oxide polymer, a solution of sodium polyacrylate (TEGO, DISPERSE 715W), a solution of modified polyacrylic resin (TEGO, DISPERSE 735W), a solution of an alkylolammonium salt of a lower molecular weight polycarboxylic acid polymer (BYK-CHEMIE, DISPERBYK), a solution of an alkylolammonium salt of a polyfunctional polymer (BYK-CHEMIE, DISPERBYK-181), and mixtures thereof. Specific examples of the high molecular weight dispersing agent which has a relatively complicated structure include, but are not limited to, siloxanes, such as polyether siloxane copolymer (TEGO, WET KL 245/WET 260); hydrophilic polymers having a structure of AB or BAB (wherein A is a hydrophobic homopolymer or copolymer of a substituted or unsubstituted $C_{1-30}$ acrylic monomer and B is a hydrophilic homopolymer or copolymer of a substituted or unsubstituted $C_{10}$ acrylic monomer). More specific examples include, but are not limited to, an acrylic acid/acrylate copolymer, a methacrylic acid/methacrylate copolymer, an acrylic acid/polydialkylsiloxane/acrylate block copolymer, and mixtures thereof. In the ink compositions according to exemplary embodiments of the present invention, the amount of the dispersing agent may be 0.01 to 10 parts by weight, and preferably 0.1 to 7 parts by weight based on 100 parts by weight of each ink composition.

The ink compositions according to exemplary embodiments of the present invention may further comprise a viscosity control agent. The viscosity control agent functions to control the viscosity of the ink composition to facilitate better spraying from the nozzles. Specific examples of the viscosity control agent include, but are not limited to, casein, hydroxymethylcellulose, hydroxyethylcellulose, and carboxymethylcellulose.

The ink compositions may further comprise a storage stabilizer, a pH adjusting agent, an antioxidant, and the like.

The black ink composition and the color ink composition, which constitute the ink set according to an embodiment of the present invention, have viscosites of 1.0 to 15 cP, and preferably 1.2 to 9.5 cP. If the ink compositions have a viscosity of less than 1.0 cP, the ink compositions may run on the recording medium while wet. If the ink compositions have viscosities of more than 15 cP, flowability of the ink compositions may be reduced, thus resulting in clogging at the nozzles.

The black ink composition may have a surface tension of 20 to 65 dyne/cm, and preferably 25 to 60 dyne/cm, and the color ink composition may have a surface tension of 20 to 45 dyne/cm, and preferably 20 to 40 dyne/cm.

The black ink composition constituting the ink set according to an embodiment of the present invention has an image density of 1.3 or more on the recording medium. Specific examples of the recording medium include, but are not limited to, common paper.

According to another embodiment of the present invention, an inkjet recording apparatus comprises the ink set described above.

The ink set, according to an embodiment of the present invention, may be contained in an ink receiving unit or an ink cartridge of the inkjet recording apparatus. The inkjet recording apparatus, according to an embodiment of the present invention, may include a thermal head which discharges ink droplets due to steam generated by heating the ink composition, a piezo head which discharges ink droplets using a piezo unit, a disposable head, or a permanent head. Further, the inkjet recording apparatus may be a scanning-type printer or an array-type printer. The inkjet recording apparatus may be used for a desktop, a textile, a hot melt, or for an industrial purpose.

The types of head and the types and applications of printer described above regarding the inkjet recording apparatus according to an embodiment of the present invention are intended to explain the inkjet recording apparatus in more detail. The ink set according to an embodiment of the present invention may be used in a variety of inkjet recording apparatuses.

According to still another embodiment of the present invention, a method forms an image using the above ink set. The image may be formed using the above inkjet recording apparatus comprising an ink receiving unit or an ink cartridge containing the ink set according to an embodiment of the present invention.

Hereinafter, the present invention will be described in more detail with reference to the following examples. However, these examples are given for the purpose of illustration and are not intended to limit the scope of the invention.

EXAMPLES

Example 1

20 g of a dispersion of a first colorant, carbon black (a 20 wt % aqueous solution), 59.8 g of water, 4 g of a first alkyl ether, 1,1'-oxybis(2-ethoxy)ethane ($C_2H_5OCH_2CH_2OCH_2CH_2OC_2H_5$:), 6 g of diethylene glycol, 10 g of ethylene glycol, and 0.2 g of TWEEN 20 were mixed and stirred well with a stirrer for at least 30 minutes until a uniform mixture was obtained.

Then, the resultant mixture was filtered through a 0.8 μm filter to prepare a black ink composition. The surface tension and viscosity of the black ink composition were determined to be 46 dyne/cm and 2.2 cP, respectively.

On the other hand, 4 g of a second colorant, ACID YELLOW 23, 77 g of water, 4 g of a second alkyl ether, 1,1'-oxybis(2-ethoxy)ethane ($C_2H_5OCH_2CH_2OCH_2CH_2OC_2H_5$), 4 g of glycerin, 10 g of ethylene glycol, and 1 g of TWEEN 20 were mixed and stirred well with a stirrer for at least 30 minutes until a uniform mixture was obtained.

Then, the resultant mixture was filtered through a 0.45 μm filter to prepare a color ink composition. The surface tension and viscosity of the color ink composition were determined to be 35 dyne/cm and 2.1 cP, respectively.

An ink set comprising the black ink composition and the color ink composition was referred to as Sample 1.

Example 2

20 g of a dispersion of a first colorant, carbon black (a 20 wt % aqueous solution), 59.8 g of water, 4 g of a first alkyl ether, 1,1'-oxybis(2-ethoxy)ethane ($C_2H_5OCH_2CH_2OCH_2CH_2OC_2H_5$:), 6 g of diethylene glycol, 10 g of ethylene glycol, and 0.2 g of TWEEN 20 were mixed and stirred well with a stirrer for at least 30 minutes until a uniform mixture was obtained.

Then, the resultant mixture was filtered through a 0.8 μm filter to prepare a black ink composition. The surface tension and viscosity of the black ink composition were determined to be 46 dyne/cm and 2.2 cP, respectively.

On the other hand, 4 g of a second colorant, ACID YELLOW 23, 71 g of water, 10 g of a second alkyl ether, 1,1'-oxybis(2-ethoxy)ethane ($C_2H_5OCH_2CH_2OCH_2CH_2OC_2H_5$:) 4 g of glycerin, 10 g of ethylene glycol, and 1 g of TWEEN 20 were mixed and stirred well with a stirrer for at least 30 minutes until a uniform mixture was obtained.

Then, the resultant mixture was filtered through a 0.45 μm filter to prepare a color ink composition. The surface tension and viscosity of the color ink composition were determined to be 33 dyne/cm and 2.7 cP, respectively.

An ink set comprising the black ink composition and the color ink composition was referred to as Sample 2.

Example 3

20 g of a dispersion of a first colorant, carbon black (a 20 wt % aqueous solution), 59.8 g of water, 6 g of a first alkyl ether, 1,1'-oxybis(2-ethoxy)ethane ($C_2H_5OCH_2CH_2OCH_2CH_2OC_2H_5$:), 6 g of diethylene glycol, 8 g of ethylene glycol, and 0.2 g of TWEEN 20 were mixed and stirred well with a stirrer for at least 30 minutes until a uniform mixture was obtained.

Then, the resultant mixture was filtered through a 0.8 μm filter to prepare a black ink composition. The surface tension and viscosity of the black ink composition were determined to be 44 dyne/cm and 2.3 cP, respectively.

On the other hand, 4 g of a second colorant, ACID YELLOW 23, 77 g of water, 4 g of a second alkyl ether, 1,1'-oxybis(2-ethoxy)ethane ($C_2H_5OCH_2CH_2OCH_2CH_2OC_2H_5$), 4 g of glycerin, 10 g of ethylene glycol, and 1 g of TWEEN 20 were mixed and stirred well with a stirrer for at least 30 minutes until a uniform mixture was obtained.

Then, the resultant mixture was filtered through a 0.45 μm filter to prepare a color ink composition. The surface tension and viscosity of the color ink composition were determined to be 35 dyne/cm and 2.1 cP, respectively.

An ink set comprising the black ink composition and the color ink composition was referred to as Sample 3.

Comparative Example A 20 g of a dispersion of a first colorant, carbon black (a 20 wt % aqueous solution), 53.8 g of water, 10 g of a first alkyl ether, 1,1'-oxybis(2-ethoxy)ethane ($C_2H_5OCH_2CH_2OCH_2CH_2OC_2H_5$:), 6 g of diethylene glycol, 10 g of ethylene glycol, and 0.2 g of TWEEN 20 were mixed and stirred well with a stirrer for at least 30 minutes until a uniform mixture was obtained.

Then, the resultant mixture was filtered through a 0.8 μm filter to prepare a black ink composition. The surface tension and viscosity of the black ink composition were determined to be 43 dyne/cm and 2.6 cP, respectively.

On the other hand, 4 g of a second colorant, ACID YELLOW 23, 77 g of water, 4 g of a second alkyl ether, 1,1'-oxybis(2-ethoxy)ethane ($C_2H_5OCH_2CH_2OCH_2CH_2OC_2H_5$), 4 g of glycerin, 10 g of ethylene glycol, and 1 g of TWEEN 20 were mixed and stirred well with a stirrer for at least 30 minutes until a uniform mixture was obtained.

Then, the resultant mixture was filtered through a 0.45 μm filter to prepare a color ink composition. The surface tension and viscosity of the color ink composition were determined to be 35 dyne/cm and 2.1 cP, respectively.

An ink set comprising the black ink composition and the color ink composition was referred to as Sample A.

Estimation Experiment—Image Quality Estimation

Image density, line sharpness, and bleeding at the interfaces between black/color inks on a recording medium were estimated for each of Samples 1, 2, 3 and A.

The black ink composition and the color ink composition constituting Sample 1 were charged into a Samsung Ink cartridge and images were formed on a common sheet of paper so that the black ink composition and the color ink composition were adjacent to each other. This process was repeated for Samples 2, 3 and A. Ten minutes after the image forming, the line sharpness and a degree of bleeding of each image were estimated. Further, the image density was determined using a densitometer (MACBETH D196). The results are shown in Table 1.

TABLE 1

| Ink composition | Sample 1 Black | Sample 1 Color (Y) | Sample 2 Black | Sample 2 Color (Y) | Sample 3 Black | Sample 3 Color (Y) | Sample A Black | Sample A Color (Y) |
|---|---|---|---|---|---|---|---|---|
| Amount of alkyl ether | 4 parts by wt | 4 parts by wt | 4 parts by wt | 10 parts by wt | 6 parts by wt | 4 parts by wt | 10 parts by wt | 4 parts by wt |
| Image density | 1.45 | 0.64 | 1.45 | 0.63 | 1.42 | 0.64 | 1.25 | 0.64 |
| Line sharpness | ○ | ○ | ○ | ○ | □ | ○ | X | ○ |
| Degree of bleeding between B/C | 0 | | 0 | | 0 | | X | |

*Estimation items for line sharpness and degree of bleeding:
○-good
□-medium
X-bad
*The amount of alkyl ether is based on 100 parts by weight of each ink composition.

It was confirmed from Table 1 that an image formed using each of Samples 1, 2 and 3 exhibited effective line sharpness and degree of bleeding between black and color inks at the interfaces and an effective density of black image, i.e., 1.45 and 1.42. Meanwhile, an image formed using Sample A exhibited ineffective line sharpness and degree of bleeding between black and color inks at the interfaces and an ineffective density of black image, i.e., 1.25. In one embodiment, as illustrated in FIG. 1, numeral 100, an inkjet recording apparatus 102 may comprise a controller 104, an ink receiving unit/ink cartridge 106, and an ink nozzle unit 108, which are utilized to output the above-described ink set to form an image 110 on an image-receiving medium 112.

In one embodiment, a method of forming an image containing the black ink composition and the color ink composition of the ink set in accordance with an embodiment of the present invention includes using the black ink composition and the color composition to form an image on an image-receiving medium, wherein the ink set is described more fully above.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An ink set comprising:
   a black ink composition consisting essentially of a first colorant, water, and a first alkyl ether; and
   a color ink composition consisting essentially of a second colorant, water, and a second alkyl ether, wherein an amount of the first alkyl ether based on 100 parts by weight of the black ink composition is at most twice an amount of the second alkyl ether based on 100 parts by weight of the color ink composition.

2. The ink set of claim 1, wherein the amount of the first alkyl ether based on 100 parts by weight of the black ink composition is less than or equal to the amount of the second alkyl ether based on 100 parts by weight of the color ink composition.

3. The ink set of claim 1, wherein the first colorant and the second colorant are each a dye, a pigment, a self-dispersible pigment, or mixtures thereof.

4. The ink set of claim 1, wherein the first alkyl ether and the second alkyl ether each have a boiling point greater than or equal to 110° C.

5. The ink set of claim 1, wherein the first alkyl ether and the second alkyl ether are respectively represented by formula 1:

$$R_1-O-(R_2-O)_m-R_3 \quad (1)$$

wherein
$R_1$ is a $C_{1-10}$ alkyl group;
$R_2$ is a $C_{2-6}$ alkylene group;
$R_3$ is a hydrogen atom or a $C_{1-10}$ alkyl group; and
m is an integer of 1 to 10.

6. The ink set of claim 1, wherein $R_1$ is a $C_{1-6}$ alkyl group, $R_2$ is a $C_{2-3}$ alkylene group, $R_3$ is a hydrogen atom or a $C_{1-6}$ alkyl group, and m is an integer of 1 to 5.

7. The ink set of claim 1, wherein the first alkyl ether and the second alkyl ether are respectively selected from the group consisting of 2-(2-butoxyethoxy)ethanol ($C_4H_9OCH_2CH_2OCH_2CH_2OH$), 2-(2-ethoxyethoxy)ethanol ($C_2H_5OCH_2CH_2OCH_2CH_2OH$), 2-methoxyethanol ($CH_3OCH_2CH_2OH$), 2-butoxyethanol ($C_4H_9OCH_2CH_2OH$), 2-(2-methoxyethoxy)ethanol ($CH_3OCH_2CH_2OCH_2CH_2OH$), 1,1'-oxybis(2-ethoxy)ethane ($C_2H_5OCH_2CH_2OCH_2CH_2OC_2H_5$), 2-(2-(2-methoxyethoxy)ethoxyethanol ($CH_3OCH_2CH_2OCH_2CH_2OCH_2CH_2OH$), 2-(2-(2-butoxyethoxy)ethoxyethanol ($C_4H_9OCH_2CH_2OCH_2CH_2OCH_2CH_2OH$), 2-propoxyethanol ($C_3H_7OCH_2CH_2OH$), 2-propoxypropanol ($C_3H_7OCH_2CH_2CH_2OH$), and 1-(2-butoxymethylethoxy)propanol ($C(CH_3)_3OCH_2CH(CH_3)OCH_2CH(CH_3)OH$).

8. The ink set of claim 1, wherein the amount of the first alkyl ether is less than or equal to 40 parts by weight based on 100 parts by weight of the black ink composition.

9. The ink set of claim 1, wherein the amount of the second alkyl ether is 0.01 to 20 parts by weight based on 100 parts by weight of the color ink composition.

10. The ink set of claim 1, wherein the ink set of the black ink composition and the color ink composition, respectively, further comprises at least one additive selected from the group consisting of a co-solvent, a wetting agent, a surfactant, a dispersing agent, a viscosity control agent, a storage stabilizer, a pH adjusting agent, and an antioxidant.

11. The ink set of claim 1, wherein the black ink composition and the color ink composition each have a viscosity of 1.0 to 15 cP.

12. The ink set of claim 1, wherein the black ink composition has a surface tension of 20 to 65 dyne/cm, and the color ink composition has a surface tension of 20 to 45 dyne/cm.

13. An inkjet recording apparatus comprising an ink receiving unit or an ink cartridge containing the ink set of claim 1.

14. A method of forming an image containing the black ink composition and the color ink composition of the ink set of claim 1, comprising using the black ink composition and the color composition to form an image on an image-receiving medium.

* * * * *

UNITED STATES PATENT AND TRADEMARK OFFICE
CERTIFICATE OF CORRECTION

PATENT NO. : 7,368,008 B2
APPLICATION NO. : 11/105489
DATED : May 6, 2008
INVENTOR(S) : Yeon-kyoung Jung et al.

It is certified that error appears in the above-identified patent and that said Letters Patent is hereby corrected as shown below:

Column 11, Lines 9-10, change "2-(2-(2-methoxyethoxy)ethoxyethanol" to --2-(2-(2-methoxyethoxy)ethoxy)ethanol--.

Column 11, Lines 11-12, change "2-(2-(2-butoxyethoxy)ethoxyethanol" to --2-(2-(2-butoxyethoxy)ethoxy)ethanol--.

Signed and Sealed this

Tenth Day of February, 2009

JOHN DOLL
*Acting Director of the United States Patent and Trademark Office*